United States Patent [19]

Allen

[11] Patent Number: 4,529,536

[45] Date of Patent: Jul. 16, 1985

[54] THIXOTROPIC FLAME INHIBITORS FOR ROCKET PROPELLANT GRAINS

[75] Inventor: Henry C. Allen, Decatur, Ala.

[73] Assignee: The United States of America as represented by the Secretary of the Army, Washington, D.C.

[21] Appl. No.: 615,413

[22] Filed: May 30, 1984

[51] Int. Cl.³ .................................................. F42B 1/00
[52] U.S. Cl. .................................. 252/182; 102/290; 523/180
[58] Field of Search ...................... 102/290; 149/19.4; 252/182; 523/180

[56] References Cited

U.S. PATENT DOCUMENTS

| | | | |
|---|---|---|---|
| 4,021,514 | 5/1977 | Daume | 149/19.4 |
| 4,034,676 | 7/1977 | Daume | 149/2 |
| 4,187,215 | 2/1980 | Wrightson | 102/290 |
| 4,232,608 | 11/1980 | Wrightson | 102/290 |
| 4,375,522 | 3/1983 | Braun | 102/290 |

*Primary Examiner*—Edward A. Miller

*Attorney, Agent, or Firm*—Anthony T. Lane; Robert P. Gibson; Jack W. Voigt

[57] ABSTRACT

Disclosed is a thixotropic flame inhibitor for a rocket propellant grain including an organic thixotrope in amounts from about 5 parts to about 30 parts into HTPB liquid polymer in amounts from about 70 parts to about 95 parts by stirring at elevated temperatures. After cooling the mixture to room temperature, appropriate quantities of di- or polyfunctional isocyanates and cure catalysts are added to promote cure at room temperature. Fine particulate matter may also be added to increase viscosity. The resulting formulation is a room-temperature curable, thixotropic mixture which will not flow under its own weight when applied to wettable non-horizontal surfaces in appreciable thicknesses, and which, when cured, is suitable as an inhibitor for composite solid rocket propellants. Thixotropy may be controlled by the level of organic thixotrope in the formulation while viscosity may be adjusted by the level of particulate filler; these parameters determine the allowable thicknesses from one-coat applications.

3 Claims, 2 Drawing Figures

THIXOTROPIC FLAME INHIBITORS FOR ROCKET PROPELLANT GRAINS

DEDICATORY CLAUSE

The invention described herein may be manufactured, used, and licensed by or for the Government for governmental purposes without the payment to me of any royalties thereon.

SUMMARY OF THE INVENTION

It is common practice in the art of solid propellant rocket propulsion to control the chamber pressure during rocket motor operation by controlling the surface area of propellant burning at a given time. The motor designer may configure the propellant grain such that the burning propellant surface area remains essentially constant during motor operation or he may design it to either increase or decrease as the propellant web burns, depending upon the particular ballistic requirements to efficiently accomplish his objective. Sometimes it is possible to achieve the desired surface area versus propellant burned relationship solely by the choice of the initial geometrical configuration of the propellant grain, but frequently it is necessary or more expedient to inhibit a portion of the asconfigured propellant surface in order to achieve the desired ballistic results. As used herein, the word "inhibit" means to coat a propellant grain face with an inert material to prevent ignition of that propellant face during motor operation. Thus the inhibitors of this invention are flame inhibitors. Typical materials used to inhibit composite propellant grains are filled rubbers which are usually compounded in an initially or plastic state from liquid oligomers of the rubber, suitable fillers, and additives and curing agents. The inhibitor compound is typically applied to the surface to be inhibited while in a fluid or plastic condition and then converted to a rubber by chemical reaction between the oligomer and the curing agent. Altneratively, the inhibitor may be prepared and cured in advance of propellant mixing, and the uncured propellant then cast against the inhibitor and cured. The general requirements for an acceptable inhibitor are that it forms a good bond to the propellant, is chemically compatible with the propellant, and has adequate thermal properties to protect the inhibited propellant face from premature ignition. It must also have adequate mechanical properties to withstand any stresses and strains which the particular application may impose upon it, although these are usually small.

Considering the applications to which inhibitors are put in solid propellant rocketry, it is seen to be advantageous to have an inhibitor which, in the uncured condition, will not flow under small stresses such as those imposed by gravity acting on moderately thick layers of the material but which will flow readily when a low yield stress is exceeded so that application is facilitated. Such rheological behavior is termed thixotropy, and fluids which exhibit such behavior are said to be thixotropic. The advantages of thixotropy in an uncured propellant inhibitor derive from the fact that such compositions can be applied in appreciable thickness to wettable non-horizontal surfaces without exhibiting subsequent flow. It will be apparent that the maximum thickness which can be applied without subsequent flow will depend largely upon the degree of thixotropy of the composition. Since many rocket motor designs require inhibitors in thicknesses of 0.1 inch or more, and since such inhibitors frequently must be applied to non-horizontal and non-planar surfaces, a high degree of thixotropy in an inhibitor composition with otherwise suitable properties would enable to rocket motor processor to apply adequate inhibitor in one thick application rather than the several thin layers with interspersed curing or drying periods as is now done.

Another desirable property in a propellant inhibitor is the ability to cure or dry at ambient temperatures so that rocket motors need not be moved in and out of ovens after propellant cure. This results in significant economies for the processor and also avoids risk of damage to the motor from additional handling and heating. Further, since thixotropic typically diminishes with increasing temperature, an ambient cure in this instance allows retention of initial thixotropic behavior.

It will be apparent from the foregoing discussion that a highly thixotropic, room-temperature curable inhibitor composition for rocket propellants would substantially advance the state-of-the-art of rocket motor manufacture. Therefore, it is an object of this invention to provide an inhibitor composition with the usual properties to satisfactorily inhibit typical propellant grains while possessing the additional property of a high degree of thixotropy in the uncured state. It is a further object of this invention to incorporate in the inhibitor composition a curing system which will provide full cure at room temperature within a few days.

A typical inhibitor for composite propellant will contain a polymeric base of similar chemical structure to the binder of the propellant, and will contain various finely divided fillers such as carbon black, clay, titanium dioxide, calcium carbonate, ground walnut hulls, or any other finely divided particulate fillers or combinations of fillers which the formulator chooses to impart the thermal and mechanical properties required for the particular application. The polymeric base typically will be initially a liquid oligomer with functional chemical groups through which curing via chemical reaction can convert the liquid to a rubber. Mixing of the fillers, curing agents, and other ingredients into the polymeric base is done before inhibitor application and cure.

Many modern composite propellants contain hydrocarbon polymers as their principal binder component. Typical of such polymers are polybutadienes with hydroxyl or carboxyl functional groups, and with average molecular weights in the range of 1000–5000 daltons. Such polymers are also excellent bases for compatible inhibitor formulations for use with these propellants.

SUMMARY OF THE INVENTION

The thixotropic flame inhibitor of this invention for use with rocket propellant grains utilizes a hydrocarbon polymer base having compatibility with the composite propellant with which it is employed. Thus, since most modern composite propellants contain hydrocarbon polymers as their principal binder component with hydroxyl or carboxyl functional groups and average molecular weights in the range of 1000–5000 daltons, these hydrocarbon polymers are also excellant bases for compatible inhibitor formulations for use with these propellants.

Accordingly, the polymer, hydroxy-terminated polybutadiene (HTPB), is the hydrocarbon polymer base of choice for the thixotropic flame inhibitor for use with a composite propellant employing a HTPB binder. A HTPB, available as Poly B-D Resin from ARCO Chemical Company, meets the molecular weight range and the functional group requirements for the hydrocarbon polymer base.

An organic thixotrope in a predetermined ratio to the polymer base is employed to achieve a high degree of thixotropy at relatively low levels of thixotrope. Thus, in parts by weight, about 10 parts of the thixotrope, Thixatrol ST, marketed by NL Chemicals, Hightstown, N.J. are blended with about 90 parts of Poly BD Resin (containing an antioxidant) until the Thixatrol ST is thoroughly wetted by the polymer. This mixture is then heated to 70° C. and stirred vigorously with a high-shear mixer, after which this mixture is allowed to cool to room temperature. This mixture (premix A) is a thick paste which is storable for long periods without appreciable change while awaiting use.

A catalyst solution is prepared by dissolving about 0.5 parts of ferric acetylacetonate (FeAA) in about 99.5 parts of Poly BD Resin.

A test inhibitor mix I is prepared by adding with stirring about 1.626 parts of hexamethylene diisocyanate, 0.714 parts of isophorone diisocyanate, and about 0.700 parts of catalyst solution to about 26.5 parts of premix A. A modified test inhibitor mix II is prepared by adding about 0.40 parts of fumed silica to about 14.77 parts of mix I. The test samples of mixes I and II are cured at about 23° C. Mix I is firm but tacky after 5 hours while Mix II requires 48 hours to reach a like state of cure. Thus, fumed silica serves to retard the rate of cure substantially.

After applying mix I to the surfaces of a typical composite propellant grain, a tough, rubbery material results after curing for about 24 hours while mix II is fully cured after about 5 to 7 days. Both cured samples were found to be firmly bonded to the propellant grain surfaces.

DESCRIPTION OF THE PREFERRED EMBODIMENTS

The thixotropic flame inhibitor of this invention for use with rocket propellant grains is prepared from a premixed thick paste containing about 70 to about 95 parts of a polymeric base of hydroxyl terminated polybutadiene with an antioxidant and about 5 to 30 parts of a thixotrope, Thixatrol ST. A catalyst solution is prepared from about 0.5 parts of ferric acetylacetonate (FeAA) and about 99.5 parts of hydroxyl terminated polybutadiene. The premix, catalyst solution, and one or more diisocyanates in a predetermined ratio are combined and cured after being applied to a solid propellant grain where it functions as a flame inhibitor.

In pursuit of the improvements derived from this invention it has been found that conventional particulate fillers, typified by those mentioned above, do not impart adequate thixotropy to HTPB-based inhibitor formulations unless used at such high levels that the mix becomes highly viscous as well as thixotropic. Such compositions are not suited to the objects of this invention, since a relatively low viscosity beyond the yield point is essential to the desired application methods for these inhibitors, such as dipping, spraying, and pouring. Therefore, to achieve the objects of this invention, it is found to be necessary to employ certain organic thixotropes. These thixotropes are hydrogenated castorwax products which are referred to as opalwax, castorwax, etc. A preferred castorwax product which was extensively tested in this invention is Thixatrol ST. A number of such materals are commercially available, and several of these were evaluated for their effect on HTPB. Although more than one showed some thixotropy in HTPB, one in particular gave a very high degree of thixotropy at relatively low levels. This material is trade named Thixatrol ST and is marked by NL Chemicals, Hightstown, N.J.

When Thixatrol ST is incorporated into Poly BD Resin by stirring at elevated temperature, the resulting mixture, after cooling to room temperature, is found to be thixotropic in proportion to the ratio of thixotrope to polymer.

Figure 1:
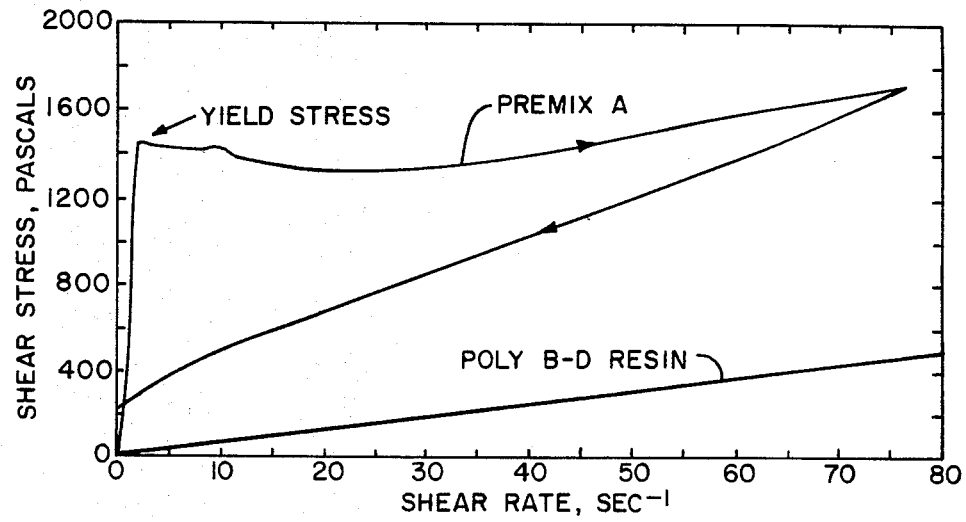
FIG. 1 of the drawing is a plotting of shear rate, sec$^{-1}$ versus shear stress, pascals, for premix A and for Poly BD Resin alone.
Figure 2:
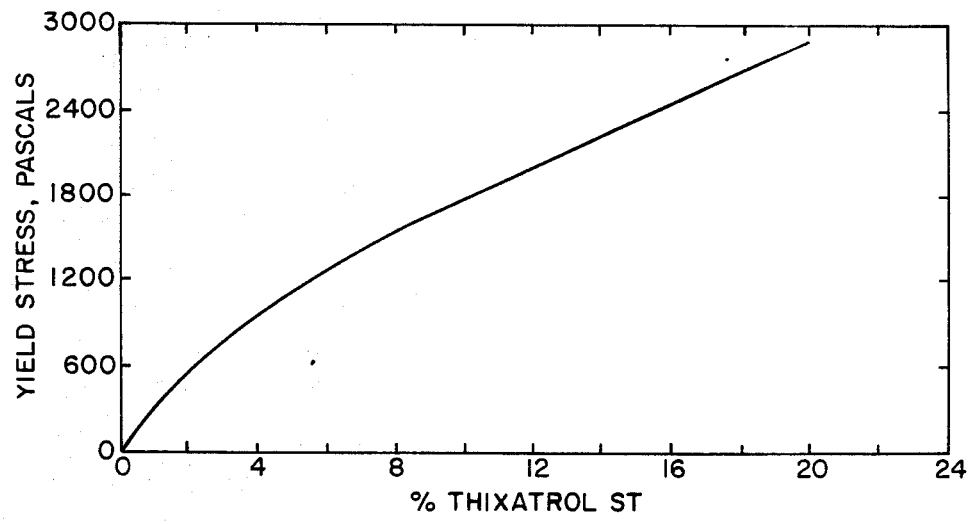
FIG. 2 of the drawing is a plotting of yield stress, pascals, versus percent Thixatrol ST in Poly BD Resin at 25° C.

In further reference to the drawing, representative data are shown in FIG. 1. It will be noted in FIG. 1 that unmodified Poly BD Resin (R45M) displays essentially a linear relationship of shear stress to shear rate. The viscosity of the samples is a function of the slopes of the lines in this figure. Thixatrol ST modifies the rheological behavior of Poly BD Resin in several ways of significance to this invention. Referring again to FIG. 1, it is seen that the thixotrope introduces a yield stress into the rheological behavior of Poly BD Resin, and FIG. 2 shows that the yield stress increases in magnitude with increasing thixotrope level. It is significant, however, that the viscosity at shear stresses above the yield stress is increased only moderately by the thixotrope. The data in FIG. 1 were taken on a rheometer in which the sample is sheared between the walls of a stationary sample cup and a rotor within the cup. The rheometer may be programmed for various modes of operation, and for these tests the rotor was programmed to increase in RPM linearly from 0 to 100, remain constant briefly at 100 RPM, then decrease linearly back to zero. In FIG. 1, the arrow pointing right designates the data obtained as the rotor accelerated from zero to 100 RPM, while the arrow pointing left designates the data obtained as the rotor speed decreased from 100 RPM to zero (the data from R45M alone at decreasing RPM retraced the same line). For the thixotropic mixture it will be noted that the line obtained at decreasing shear rate shows a substantial residual shear stress in the sample after the rotor has stopped turning (zero RPM). This residual stress is a measure of the ability of the sample to resist deformation or flow under stresses such as those resulting from gravity acting on the mass of the sample. It is because of this behavior that the material does not flow when applied in substantial thicknesses to non-horizontal surfaces.

The foregoing data and discussion are presented to clarify the basis of the invention, and to show that highly thixotropic HTBP mixtures have been discovered. It will now be shown that room-temperature curable formulations which are based on such mixtures have been invented and thus achieve the objects of this invention.

It is well known in the art that HTBP is readily cured by a number of chemical compounds containing two or more isocyanate groups in their structures. Many such compounds are commercially available, and the choice of one or more of these is largely at the discretion of the formulator. It is not critical to this invention which of these compounds is used, but it has been found that the following are suitable: Toluene diisocyanate (TDI), hexamethylene diisocyanate (HDI), isophorone diisocyanate (IPDI), dimer acid diisocyanate (DDI), and cyclic polymers of HDI and IPDI.

The uncatalyzed cure reaction between HTPB and any of the isocyanate compounds mentioned above proceeds quite slowly at ordinary room temperatures, so much so that achieving adequate cure would take an unacceptably long time. Consequently, it is expedient to catalyze this reaction for the purposes of this invention. Again, the well-known art provides an abundance of catalysts from which to choose. Among the more widely used catalysts for isocyanatehydroxyl reaction are soluble organic compounds of certain metals such as iron, tin, bismuth, thorium and others. Organic moieties of such catalysts include actylacetonate, alkyl, aryl, carboxylate and many other groups familiar to those skilled in the art. Suitable catalytic compounds include, but are not limited to, the following illustrative types: ferric acetylacetonate, dibutyl tin dilaurate, diphenyl bismuth chloride, and thorium acetylacetonate.

It has been found that the thixotropy and viscosity of HTPB-Thixatrol ST mixtures are diminished by addition of both curing agents and cure catalysts. Thus the initial HTPB-thixotrope mixtures must be formulated to a substantially higher degree of thixotropy than that desired in the complete uncured inhibitor mix to allow for the decreases caused by the curing agents and catalysts. It has been found that HTPB-thixotrope ratios from about 95/5 to about 70/30 permit formulation of room-temperature curable inhibitor mixes which, when applied in the uncured state to vertical surfaces, do not flow due to gravity in thicknesses from about 0.05 inches to about 0.25 inches.

When small propellant grains were experimentally inhibited by dipping them in uncured inhibitor of this invention, it was found that the thickness of inhibitor remaining on the dipped grains was partly a function of the rate at which the submerged grains were withdrawn from the inhibitor mix. Classical rheology teaches that this effect results from the shear stress-shear rate relationship, and that the effect is greater as the slope of shear stress versus shear rate response (viscosity) increases. Since it was desirable in some cases to increase the inhibitor thickness on dipped grains without increasing inhibitor thixotropy (to facilitate handling and transfer), the viscosity of inhibitor formulations intended for use via dipping was increased by adding small amounts of very fine particulate matter such as fumed silica or carbon black rather than by greater amounts of organic thixotrope. Thus a novel feature of materials of this invention is that the thixotropy of the formulations can be readily controlled via the level of organic thixotrope while any additional needed viscosity is readily provided by adding fine particulate material. Further, the thickness of inhibitor applied by dipping can be varied through both mix rheology and rate of withdrawal of the dipped grain from the mix. This range of versatility greatly enhances the usefulness of the invention.

The following examples provide the preferred ranges in parts by weight, preparation procedures, curing procedures, and how to use the flame inhibitor of this invention.

Examples—All parts are by weight in the following example:

Preparation of Pre-mixes: 10 parts of Thixatrol ST and 90 parts of Poly BD Resin containing an antioxidant were mixed together slowly until the Thixatrol ST was thoroughly wetted by the polymer. The mixture was then heated to 70° C. and stirred vigorously with a high-shear mixer, after which it was allowed to cool to room temperature. The mixture (Premix A) was then a thick paste which could be stored for long periods without appreciable change while awaiting use. Also a catalyst solution was prepared by dissolving 0.5 parts of ferric acetylacetonate (FeAA) in 99.5 parts of Poly BD Resin.

Preparation of Inhibitor Mix I: To 26.500 parts of Premix A was added with stirring 1.626 parts of HDI, 0.714 parts of IPDI and 0.7000 parts of catalyst solution. A test rod was plunged into this inhibitor mix and withdrawn, and was found to be uniformly coated with about 0.095 inch thickness of inhibitor which did not flow subsequent to withdrawal.

Preparation of Inhibitor Mix II: To 14.77 parts of Mix I was added 0.40 parts of fumed silica with slow stirring until the silica was homogeneously incorporated. Test rods were dip-coated with this mixture, and were found to have uniform coating thicknesses which varied from sample to sample, according to the rate of withdrawal, from 0.045 to 0.170 inches. There was no flow of the coatings after withdrawal.

Inhibitor Cure: The test samples of Mixes I and II were cured at 23° C. It was found that Mix I was firm but tacky after 5 hours while Mix II required 48 hours to reach a like state of cure. Thus it was seen that fumed silica retarded the rate of cure substantially.

Inhibitor Properties and Bond to Propellant: Mix I was fully cured in about 24 hours while Mix II was fully cured in about 5 to 7 days. Both were tough, rubbery materials in the cured state. Samples of both mixes which had been applied to surfaces of a typical composite propellant were found to be firmly bonded to those surfaces after inhibitor cure.

Thermal Properties: The thermal properties of Mix II are shown in Table 1. These show the inhibitor to be equal or superior to other common inhibitor materials in those properties which are critical to thermal performance as a propellant inhibitor.

Rocket Motor Tests: Inhibitor of Mix II formualtion was applied to one end of cylindrical propellant grains in small test rocket motors in thicknesses up to 0.10 inch on vertical propellant faces, and no subsequent flow occurred. These motors were fired after inhibitor cure and both the ballistic data and post-fire visual inspection showed that the inhibitor had performed satisfactorily in all respects.

TABLE I

| PROPERTIES OF MIX II (After cure) | | |
| --- | --- | --- |
| Density, gm/cc | 0.942 | |
| Class Transition Temperature, °C. | −84 to −78 | |
| Thermogravimetric Analysis | °C. | % Weight Loss |
| | 100 | 0 |
| | 200 | 0 |
| | 300 | 1.0 |
| | 400 | 8.0 |
| | 450 | 23.0 |
| | 500 | 86.0 |
| | 600 | 99.0 |
| Thermal Expansion, in/in °F. (from −69 to 77° F.) | $13.70 \times 10^{-5}$ | |
| Thermal Conductivity, cal/cm sec °C. | $5.772 \times 10^{-4}$ | |
| Specific Heat, cal/gm °C. | $4.298 \times 10^{-1}$ | |
| Thermal Diffusivity, cm²/sef | $14.25 \times 10^{-4}$ | |

I claim:

1. A flame inhibitor for solid rocket propellants which in the uncured state has highly thixotropic rheological behavior resulting from incorporation of an organic thixotrope into a hydroxyl terminated polybutadiene polymer and which is formulated with curing agents and cure catalysts to cure at room temperature to a firm rubber, said flame inhibitor for solid rocket propellants comprising:

i. an organic thixotrope of a hydrogenated castor oil combined in a predetermined amount by weight of about 10 parts with said hydroxyl terminated polybutadiene polymer in a predetermined amount by weight of about 90 parts to form a storable premix;

ii. a predetermined amount by weight of said storable premix blended with one or more curing agents selected from the group consisting of toluene diisocyanate, hexamethylene diisocyanate, isophorone diisocyanate, dimer acid diisocyanate, and dimers and trimers of hexamethylene diisocyanate and isophorone diisocyanate; and, iii. a soluble organic catalyst compound blended with said storable premix having one or more of said curing agents blended therein, said soluble organic catalyst compound selected from the group consisting of ferric acetylacetonate, dibutyl tin dilaurate, diphenyl bismuth chloride, and thorium acetylacetonate.

2. The flame inhibitor for solid rocket propellants of claim 1 comprised of about 26.500 parts of said storable premix, of said curing agent which is comprised of about 1.626 parts of hexamethylene diisocyanate and of about 0.714 parts of isophorone diisocyanate, and of said cure catalyst of about 0.700 parts, said cure catalyst prepared by dissolving about 0.5 parts of ferric acetylacetonate in about 99.5 parts of hydroxy-terminated polybutadiene.

3. The flame inhibitor for solid rocket propellants of claim 2 wherein said flame inhibitor in an amount of about 14.77 parts while in an uncured state is combined with about 0.40 parts of fumed silica until said fumed silica is homogeneously incorporated, said fumed silica functioning to substantially retard the cure rate and extend cure time from about 24 hours to about 5 days as compared with a like flame inhibitor for solid rocket propellants except for not containing said fumed silica.

* * * * *